Sept. 13, 1966 I. J. P. JAMES ET AL 3,272,916

COLOR TELEVISION SYSTEMS UTILIZING A TRUE LUMINANCE SIGNAL

Filed May 14, 1963 2 Sheets-Sheet 1

United States Patent Office 3,272,916
Patented Sept. 13, 1966

3,272,916
COLOR TELEVISION SYSTEMS UTILIZING A TRUE LUMINANCE SIGNAL

Ivanhoe John Penfound James and Wieslaw Antoni Karwowski, London, England, assignors to Electric & Musical Industries Limited, Hayes, England, a company of Great Britain Filed May 14, 1963, Ser. No. 280,293
Claims priority, application Great Britain, May 16, 1962, 18,771/62; June 15, 1962, 23,013/62
6 Claims. (Cl. 178—5.4)

Figure 1:
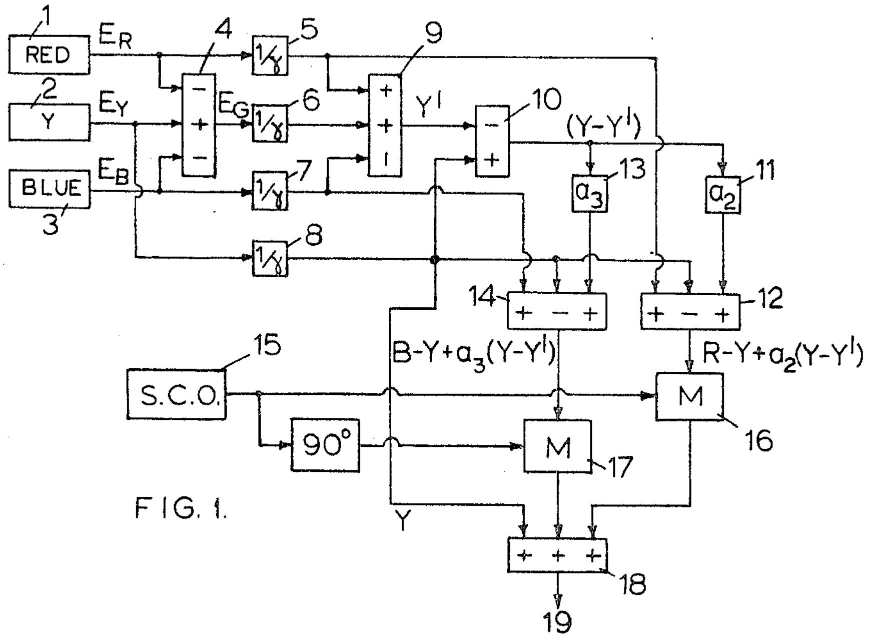

The present invention relates to colour television systems, and in particular to the composition of the colour television video waveform.

The video waveform of the N.T.S.C. television system comprises a monochrome component and two colour difference components. The monochrome component is expressed as:

$$lE_R^{1/\gamma}+mE_G^{1/\gamma}+nE_B^{1/\gamma}$$

where $E_R$, $E_G$ and $E_B$ are signals representing the red, green and blue components of the picture to be transmitted, and *l, m* and *n* are numerical constants which, in order to comply with the so-called constant luminance principle, are usually 0.30, 0.59 and 0.11 respectively. A monochrome component expressed as above is hereinafter denoted as Y'. The colour difference signals of an N.T.S.C. system are, moreover, $R—Y'$ and $B—Y'$ respectively, where R and B represent $$E_R^{1/\gamma} \text{ and } E_B^{/1\gamma}$$

The colour difference signals are, moreover, confined to relatively narrow frequency bands compared with the frequency band of the monochrome signal.

A disadvantage of the N.T.S.C. system is that the monochrome component does not represent the true luminance of the picture, some of the luminance information being conveyed only by the colour difference signals. Therefore, when the picture is reproduced by the colour television receiver some of the luminance is reproduced with the low definition of the colour signals, and if the picture is reproduced in a monochrome receiver some of the luminance information is not reproduced at all. In order to overcome this disadvantage, it has been proposed to change the composition of the monochrome signal so that it represents more accurately the luminance of the picture. Such a signal may be expressed as:

$$(lE_R+mE_G+nE_B)^{1/\gamma}$$

where *l, m* and *n* are again numerical constants and may be 0.30, 0.59 and 0.11 respectively. A monochrome signal which is a true luminance signal will be denoted hereinafter as Y, and where such a monochrome signal is transmitted, there is then the choice of transmitting colour difference signals which either have the compositions expressed above, or have compositions expressed by $R—Y$ and $B—Y$ respectively. However, the transmission of a monochrome signal which is a true luminance signal has the disadvantage that it becomes more difficult to achieve the correct colour rendering at a receiver, and if a receiver is designed for the reception of the N.T.S.C. video waveform, all the colour signal voltages derived at the receiver for application to the colour reproducing tube are incorrect if the colour difference signals are of the form $R—Y'$ and $B—Y'$ respectively, and the green signal voltage is incorrect if the colour difference signals are of the form $R—Y$ and $B—Y$ respectively.

The object of the present invention is to provide an improved colour television system with a view to reducing the disadvantages indicated in the preceding paragraphs.

According to the present invention there is provided a "colour television system comprising means for producing a video waveform representing a picture to be transmitted including means for generating a relatively wide frequency band luminance signal of the form $$(E_Y)^{1/\gamma}—a_1A_1$$

wherein $E_Y$ is a signal of the form obtainable from a monochrome television camera, and means for generating two relatively narrow frequency band colour signals of the form $R_D+a_2A_2$ and $B_D+a_3A_3$ wherein $R_D$ and $B_D$ are colour difference signals, $A_1$, $A_2$ and $A_3$ are signals which are zero for uncoloured portions of the picture and increase with the increase of the product of colour saturation and luminance, and $a_1$, $a_2$ and $a_3$ are numerical constants which have selected magnitudes and signs to allow three substantially correct primary colour control signals to be derived by linear operations on said luminance signal and said colour signals, means for generating a composite video waveform responsive to said luminance signal and said colour signals, and means for modulating a carrier oscillation by said video waveform.

The present invention is based on the following considerations. In a receiver of the N.T.S.C. type, if colour difference signals $R_D$ and $B_D$ of the form $R—Y$ and $B—Y$ are received, the matrixing circuit of the receiver produces a third colour difference signal, which can be shown to be equal to $G—Y+1.7(Y—Y')$, where G represents $E_G^{1/\gamma}$. If at the same time, the received monochrome signal represents the true luminance Y, the three colour signal voltage effective on the guns of the shadow mask tube are respectively:

$$R$$
$$G+1.7(Y—Y')$$
$$B$$

It will be appreciated that these signals are confined to the band-widths appropriate to the respective colour difference signals. At higher frequencies the luminance signal Y alone remains effective on the guns. In this case it can be seen that only the green signal is in error and that the error is proportional to $(Y—Y')$ which may be called the luminance difference.

If, on the other hand, a receiver having a linear matrixing circuit such as an N.T.S.C. type receiver has applied to it colour difference signals $R_D$ and $B_D$ of the form R—Y' and B—Y', the third colour difference signal produced has the form G—Y'. If, moreover, the received monochrome signal is a true luminance signal such as represented by Y, the three colour signal voltages which are effective on the three guns of the shadow mask tube are respectively:

$$R+(Y—Y')$$
$$G+(Y—Y')$$
$$B+(Y—Y')$$

It can therefore be seen that each of the colour signals is greater than it should be and that the error equals $(Y—Y')$ the luminance difference. The luminance difference is zero for white or grey elements of the picture to be reproduced and increases as the product of luminance and saturation increases.

In order that the present invention may be clearly understood and readily carried into effect, it will now be more fully described with reference to the accompanying drawings, of which:

FIGURE 1 shows in diagrammatic form apparatus including a three tube camera for producing the video waveform in a system according to one example of the invention.

Figure 2:
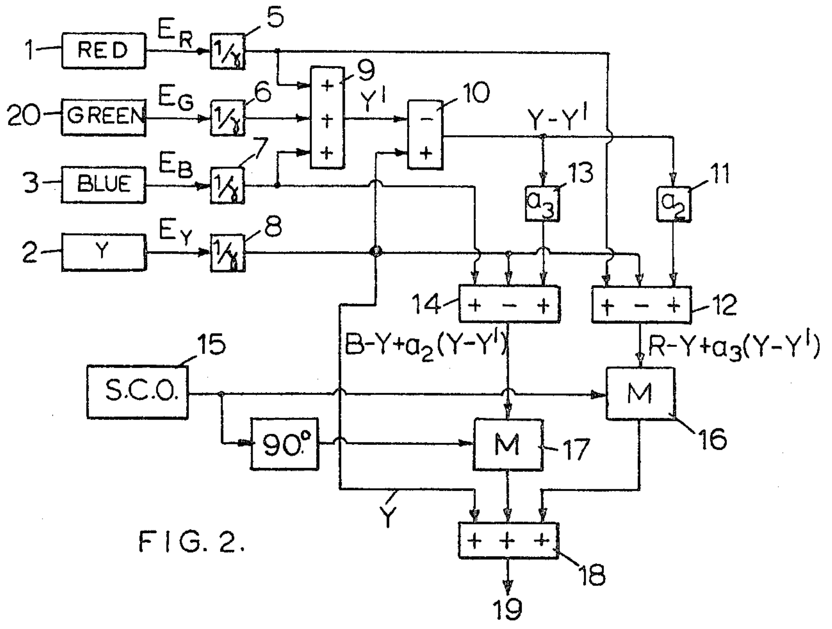
Figure 3:
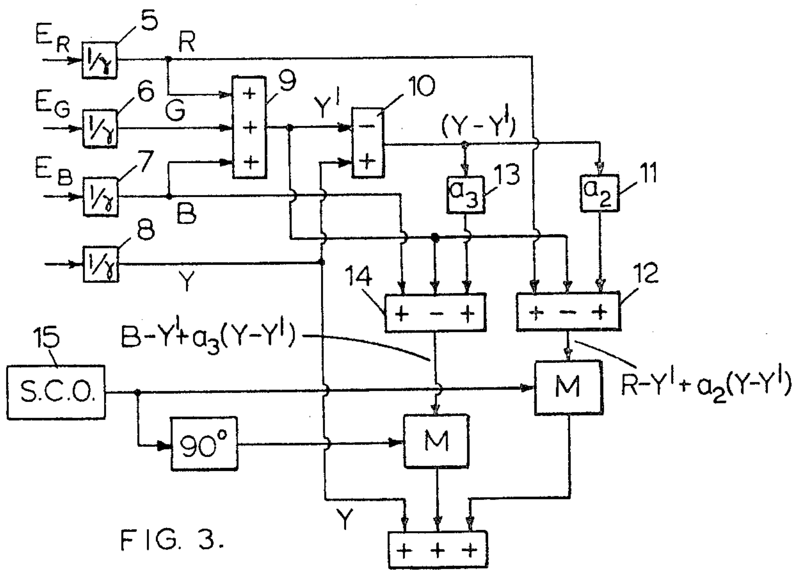
Figure 4:
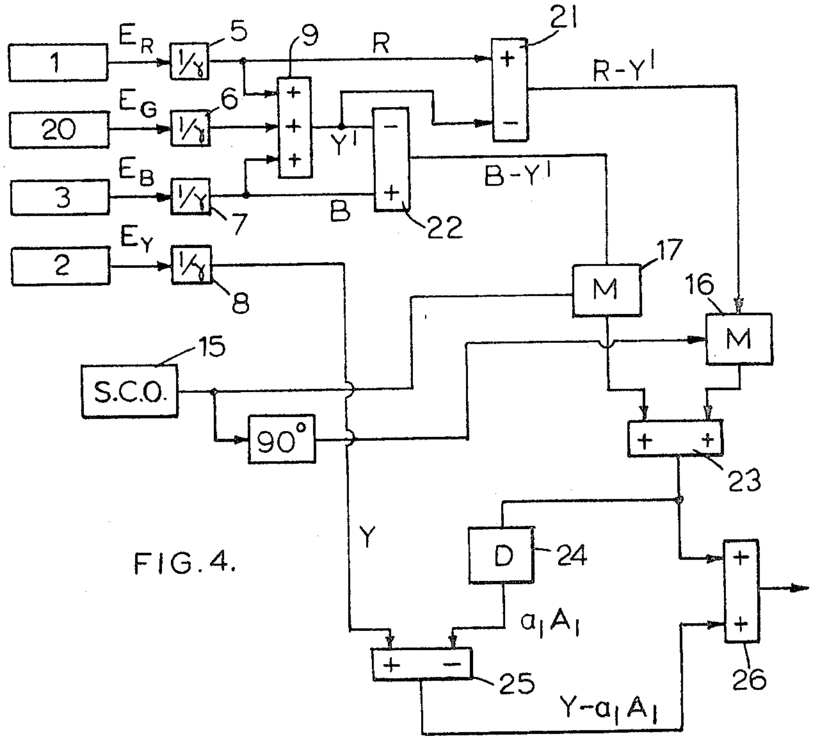

FIGURE 2 illustrates a modification of the apparatus shown in FIGURE 1, whereby a four tube camera is incorporated, FIGURE 3 illustrates another modification of the apparatus shown in FIGURE 1, to allow for the production of a colour difference signal of another composition, and FIGURE 4 illustrates in diagrammatic form apparatus for producing the video waveform in another system according to the present invention.

Referring now to FIGURE 1 the rectangles 1, 2 and 3 represent the pick-up tubes of a colour television camera. Signal voltages representing the red component, the luminance and the blue component of the pictures to be reproduced are derived from pick-up tubes 1, 2 and 3 respectively, which for purposes of description are assumed to have linear characteristics. These voltages are matrixed in the circuit 4 to produce the green signal voltage $E_G$. The four signal voltages $E_R$, $E_G$, $E_B$ and $E_Y$ are applied to gamma correction circuits 5, 6, 7 and 8 respectively to produce $E_R^{1/\gamma}$, $E_G^{1/\gamma}$, $E_B^{1/\gamma}$ and $E_Y^{1/\gamma}$, namely R, G, B and Y using the symbols defined above. The outputs of circuits 5, 6 and 7 are summed by the adder 9 to produce the signal Y′, which is subtracted from Y from the circuit 8 by differencing circuit 10. The output of the circuit 10 is $Y-Y'$, the luminance difference signal and is used for modifying the colour difference signals. The output of 10 is multiplied in 11 by the coefficient $a_2$ and combined with the outputs of circuits 5 and 8 in the combining circuits 12 to produce a red colour difference signal $R-Y$ to which has been added $a_2(Y-Y')$. The output of 10 is also multiplied by coefficient $a_3$ in 13 and combined with the outputs of circuits 7 and 8 in the combining circuit 14 to produce a blue colour difference signal $B-Y$ to which has been added $a_3(Y-Y')$. The resultant colour difference signals $R-Y+a_2(Y-Y')$ and $B-Y+a_3(Y-Y')$ are used to modulate in phase quadrature the output of a sub-carrier oscillator 15 by means of the modulators 16 and 17. The modulators are balanced modulators. The modulated sub-carriers are combined with the output Y of the circuit 8 to produce the video waveform at 19. The video waveform thus comprises a true luminance signal Y and two modified colour difference signals, as explained above. In practice the constants $a_2$ and $a_3$ may each be equal to ½, a value which gives a substantial compromise between the errors which arise with colour difference signals of the form $R-Y$ and $B-Y$ and those which arise with colour difference signals of the form $R-Y'$ and $B-Y'$.

FIGURE 2 illustrates how apparatus shown in FIGURE 1 may be modified if the camera has four pick-up tubes one of which produces directly a signal representing the luminance and the other three of which produce signal voltages representing the red, green and blue components of the picture to be transmitted. Corresponding components in FIGURES 1 and 2 are denoted by the same references in the two figures and the additional pick-up tube for deriving the signal $E_G$ is denoted by the reference 20. By virtue of this tube, the matrixing circuit 4 is dispensed with in the apparatus illustrated in FIGURE 2.

It will be understood that in both FIGURES 1 and 2 the outputs of the combining circuits 12 and 14 are confined to relatively narrow frequency bands compared with the signal Y which is applied from the gamma correcting circuit 8 directly to the combining circuit 18.

Apparatus similar to that shown in FIGURES 1 and 2 may also be used in colour television systems adapted for the formation of colour difference signals such as are transmitted in the N.T.S.C. system but modified so as to correct for the colour errors which would arise on reproduction due to the transmission of the true luminance signal Y. In this case, the combining circuits 12 and 14 are arranged to generate colour difference signals which can be expressed as:

$$R-Y'+a_2(Y-Y')$$

$$B-Y'+a_3(Y-Y')$$

As explained above, errors in colour rendering arise in receivers which receive a true luminance signal Y and colour difference signals $R-Y'$ and $B-Y'$ because the colour signal voltages applied to the image reproducing tube are all greater than they should be. Therefore, the linear modifications which are required in the case under consideration should be such as to reduce the colour difference signals, and since $Y-Y'$ is always positive, the constants $a_2$ and $a_3$ are negative in this case. For example, the constants $a_2$ and $a_3$ may each be equal to −½.

FIGURE 3 shows how the apparatus illustrated in FIGURE 1 may be modified to produce colour difference signals of modified N.T.S.C. form, the modification illustrated in FIGURE 3 being self explanatory, and evidently a similar modification may be made to the apparatus illustrated in FIGURE 2.

As already explained, an N.T.S.C. receiver, receiving a true luminance signal Y, and N.T.S.C. colour difference signals $R-Y'$ and $B-Y'$ gives rise to equal errors in the three colour signal voltgaes which are effective on the three guns of the shadow mask tube. It is therefore feasible in accordance with the invention, to reduce these errors by a linear modification of the luminance signal instead of the colour difference signals, and FIGURE 4 illustrates apparatus according to one example of the invention in which the transmitted luminance signal is thus modified. The apparatus illustrated in FIGURE 4 is similar to that shown in FIGURE 2 inasmuch as it employs a four tube camera having red, green, Y and blue pick-up tubes 1, 20, 2 and 3. Circuit components 5 to 9 derive from the outputs of the pick-up tubes signals R, B, Y′ and Y. The signals R and Y′ are fed to a combining circuit 21 to produce a narrow band signal $R-Y'$, and the signals B and Y′ are fed to a combining circuit 22 to produce a narrow band signal $B-Y'$. These two signals are then applied to balanced modulators 16 and 17 to produce phase quadrature modulation of a sub-carrier oscillation obtained from an oscillator 15. The outputs of the oscillators 16 and 17 are then added in combining circuit 23 to produce a phase and amplitude modulated oscillation which in the N.T.S.C. system is known as the chrominance signal. The apparatus illustrated in FIGURE 4 takes advantage of the fact that the amplitude of the chrominance signal is a function which is zero for white or grey and increases as the product of saturation and luminance increases. Part of the chrominance signal is therefore applied to an amplitude modulation detector 24 to produce a signal denoted as $a_1A_1$ proportional to the amplitude of the chrominance signal, $a_1$ being the constant of proportionality. This signal which is a narrow band signal of bandwidth corresponding to the chrominance signal, is subtracted in subtracting circuit 25 from the signal Y derived from the gamma correcting circuit 8 to produce a luminance signal $Y-a_1A_1$. The resultant luminance signal $Y-a_1A_1$ is then added to the chrominance signal from the combining circuit 23 in a combining circuit 26 and the resultant video waveform is used to modulate the carrier wave of the system. In this form of the invention although the signal $A_1$ is not exactly proportional to $(Y-Y')$ it behaves roughly in the same way as this function. Moreover, insofar as the resultant transmitted luminance signal departs from a true luminance signal Y, only the low frequency components are effected so that the improved definition inherent in the fact that the signal Y is obtained from a single high definition tube is largely preserved irrespective of whether the transmitted video waveform is reproduced by a colour television receiver or a monochrome television receiver. In addition, as A is zero for grey or white the luminance component is the true luminance component for grey or white parts of the reproduced picture. The modification of the luminance signal has, moreover, the effect of reducing the colour errors which would arise in the case of the transmission of an unmodified luminance signal Y. In the case of the apparatus such as illustrated in FIGURE 4, the constant $a_1$ may be ⅕.

The various forms of the invention are also applicable to systems in which the colour difference signals, modified or not as the case may be, are transmitted sequentially in alternate lines, by amplitude or frequency modulation of a sub-carrier oscillation. The invention is moreover applicable to the so-called P.A.L. system of transmission in which I and Q are formed by linear combinations of the colour difference signals and transmitted by quadrature modulation of a sub-carrier oscillation, the resultant chrominance signal differing from the N.T.S.C. chrominance signal however by reversing the phrase of one of the modulating signals, say the Q signal in alternate line intervals. In such systems, flicker effects can be reduced by using the Y form of signal compared with the Y′ form. Other modes of transmission may also be adopted.

While the invention is effective in reducing substantially the colour errors which would otherwise arise in a linear receiver of N.T.S.C. or other type, due to the transmission of a true gamma corrected luminance signal, means may be provided in receivers for reducing still further the residual errors.

In the apparatus which is herein described with reference to the drawings the linear signal modification according to the invention is such as to effect either the luminance signal Y or the colour difference signals. However in some cases the effect of the modification may be such divided between the luminance signal and the colour difference signal.

What we claim is:

1. A colour television system comprising means for producing a video waveform representing a picture to be transmitted including means for generating a relatively wide frequency band luminance signal of the form $$(E_Y)^{1/\gamma}-a_1A_1$$

wherein $E_Y$ is a signal of the form obtainable from a monochrome television camera, and means for generating two relatively narrow frequency band colour signals of the form $R_D+a_2A_2$ and $B_D+a_3A_3$ wherein $R_D$ and $B_D$ are colour difference signals, $A_1$, $A_2$ and $A_3$ are signals which are zero for uncoloured portions of the picture and increase with the increase of the product of colour saturation and luminance, and $a_1$, $a_2$ and $a_3$ are numerical constants which have selected magnitudes and signs to allow three substantially correct primary colour control signals to be derived by linear operations on said luminance signal and said colour signals, means for generating a composite video waveform responsive to said luminance signal and said colour signals, and means for modulating a carrier oscillation by said video waveform.

2. A colour television system according to claim 1 in which the luminance signal Y is derived from a single pick-up tube.

3. A colour television system comprising means for producing a video waveform representing a picture to be transmitted including means for generating a gamma corrected relatively wide band luminance signal Y of the form $(lE_R+mE_G+nE_B)^{1/\gamma}$ wherein $l$, $m$ and $n$ are positive numerical constants and $E_R$, $E_G$ and $E_B$ respectively are signal components representing the red, green and blue components of the picture, and means for generating two relatively narrow band colour difference signals of the form $$(E_R)^{1/\gamma}-Y+a_2(Y-Y')$$

and $$(E_B)^{1/\gamma}-Y+a_3(Y-Y')$$

wherein Y′ is a signal of the form $$(lE_R^{1/\gamma}+mE_G^{1/\gamma}+nE_B^{1/\gamma})$$

and $a_2$ and $a_3$ are positive constants less than unity.

4. A colour television system comprising means for producing a video waveform representing a picture to be transmitted including means for generating a gamma corrected relatively wide band luminance signal Y of the form $(lE_R+mE_G+nE_B)^{1/\gamma}$ wherein $l$, $m$ and $n$ are positive numerical constants and $E_R$, $E_G$ and $E_B$ respectively are signal components representing the red, green and blue components of the picture, and means for generating two relatively narrow band colour difference signals of the form $$(E_R)^{1/\gamma}-Y'+a_2(Y-Y')$$

and $$(E_B)^{1/\gamma}-Y'+a_3(Y-Y')$$

wherein Y′ is a signal of the form $$(lE_R^{1/\gamma}+mE_G^{1/\gamma}+nE_B^{1/\gamma})$$

and $a_2$ and $a_3$ are negative constants less than unity.

5. A colour television system comprising means for producing a video waveform representing a picture to be transmitted including means for generating a luminance signal of the form $Y-a_1A_1$, where Y is a relatively wide frequency band gamma corrected luminance signal of the form $(lE_R+mE_B+nE_G)^{1/\gamma}$ wherein $l$, $m$ and $n$ are positive numerical constants and $E_R$, $E_G$ and $E_B$ respectively are signal components representing the red, green and blue components of the picture, $a_1$ is a numerical constant and $A_1$ is a relatively narrow frequency band signal which is zero for uncoloured portions of the picture and increases with the increase of the product of colour saturation and luminance, and means for generating two relatively narrow frequency band colour difference signals of the form $$E_R^{1/\gamma}-Y' \text{ and } E_B^{1/\gamma}-Y'$$

wherein Y′ is a signal of the form $$(lE_R^{1/\gamma}+mE_B^{1/\gamma}+nE_G^{1/\gamma})$$

6. A colour television system according to claim 5 comprising means for deriving a chrominance signal which is amplitude modulated in phase quadrature by the colour difference signals $R-Y'$, $B-Y'$ and means for deriving the signal $A_1$ by detecting the amplitude of the resultant chrominance signal.

References Cited by the Examiner

UNITED STATES PATENTS

| | | | |
|---|---|---|---|
| 2,773,116 | 12/1956 | Chatten | 178—5.2 |
| 2,833,851 | 5/1958 | Loughlin | 178—5.2 |
| 2,903,506 | 9/1959 | Livingston | 178—5.4 |
| 2,920,130 | 1/1960 | Gibson et al. | 178—5.2 |
| 3,196,205 | 7/1965 | Bedford | 178—5.4 |

OTHER REFERENCES

Livingston: Reproduction of Luminance Detail of NTSC Color Television Systems, Proceedings of the I.R.E. vol. 42, No. 1. January 1954.

DAVID G. REDINBAUGH, *Primary Examiner.*

J. A. O'BRIEN, *Assistant Examiner.*